US012650618B2

(12) United States Patent
Zeng et al.

(10) Patent No.: US 12,650,618 B2
(45) Date of Patent: Jun. 9, 2026

(54) DISPLAY MODULE AND DISPLAY DEVICE

(71) Applicants: Chengdu BOE Optoelectronics Technology Co., Ltd., Chengdu (CN); BOE Technology Group Co., Ltd., Beijing (CN)

(72) Inventors: Yilun Zeng, Beijing (CN); Liang Gao, Beijing (CN); Hao Sun, Beijing (CN); Enjian Yang, Beijing (CN); Xiaoxia Huang, Beijing (CN); Ajuan Du, Beijing (CN); Feifan Li, Beijing (CN); Hufei Yang, Beijing (CN); Yiqian Wu, Beijing (CN); Guodong Zeng, Beijing (CN); Yunhui Huang, Beijing (CN); Wei Chen, Beijing (CN); Mengliang Yao, Beijing (CN); Yongle Wang, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 133 days.

(21) Appl. No.: 18/693,942

(22) PCT Filed: Aug. 1, 2023

(86) PCT No.: PCT/CN2023/110544
§ 371 (c)(1),
(2) Date: Mar. 20, 2024

(87) PCT Pub. No.: WO2024/046007
PCT Pub. Date: Mar. 7, 2024

(65) Prior Publication Data
US 2024/0393623 A1 Nov. 28, 2024

(30) Foreign Application Priority Data

Aug. 31, 2022 (CN) .......................... 202211059438.8

(51) Int. Cl.
G02F 1/01 (2006.01)

(52) U.S. Cl.
CPC .......... G02F 1/0102 (2013.01); G02F 1/0121 (2013.01); *G02F 2201/56* (2013.01); *G02F 2202/28* (2013.01)

(58) Field of Classification Search
CPC ................. G06F 1/1601; G02F 1/1333; G02F 1/133354; G02F 1/1337; G02F 1/133707; G02F 1/133776
See application file for complete search history.

(56) References Cited

U.S. PATENT DOCUMENTS 10,503,297 B2 * 12/2019 Zeng .................... H04M 1/0266
10,521,040 B2 * 12/2019 Lin ........................ G06F 1/1626
(Continued)

FOREIGN PATENT DOCUMENTS

CN 109085955 A 12/2018
CN 110908163 A 3/2020
(Continued)

*Primary Examiner* — Adrian S Wilson
(74) *Attorney, Agent, or Firm* — IPro, PLLC

(57) ABSTRACT

A display module and a display device are provided. The display module includes: a display panel including a display area and a non-display area surrounding the display area; an optical adhesive layer (2) located on a light emitting side of the display panel and covering the display area; and a cover plate, located on a side of the optical adhesive layer facing away from the display panel and covering the display panel and the optical adhesive layer. A limiting groove used for preventing an edge of the optical adhesive layer from overflowing is formed on a side of the cover plate facing the optical adhesive layer. A least the edge of the optical adhesive layer is in the limiting groove.

15 Claims, 5 Drawing Sheets

(56)                  References Cited

U.S. PATENT DOCUMENTS

| | | | | |
|---|---|---|---|---|
| 10,534,462 | B2 * | 1/2020 | Lin | G06F 1/1626 |
| 11,510,330 | B2 * | 11/2022 | E | G02B 5/3033 |
| 11,545,651 | B2 * | 1/2023 | Ji | H10K 59/8722 |
| 12,225,674 | B2 * | 2/2025 | Luo | G09F 9/30 |
| 2014/0016043 | A1 * | 1/2014 | Chen | H04N 9/3197 |
| | | | | 349/12 |
| 2018/0196559 | A1 * | 7/2018 | Lin | G06F 1/1626 |
| 2019/0050094 | A1 * | 2/2019 | Zeng | G06V 40/13 |
| 2019/0294286 | A1 * | 9/2019 | Lin | G06F 3/0412 |
| 2020/0212369 | A1 * | 7/2020 | Ji | H10K 59/8722 |
| 2021/0392767 | A1 * | 12/2021 | E | G03B 17/02 |
| 2023/0178526 | A1 * | 6/2023 | Li | G02B 5/3033 |
| | | | | 257/88 |
| 2024/0260216 | A1 * | 8/2024 | Luo | H05K 5/03 |
| 2025/0151221 | A1 * | 5/2025 | Luo | G09F 9/30 |

FOREIGN PATENT DOCUMENTS

| | | | |
|---|---|---|---|
| CN | 112198695 | A | 1/2021 |
| CN | 213546359 | U | 6/2021 |
| CN | 113075807 | A | 7/2021 |
| CN | 113589567 | A | 11/2021 |
| CN | 113948563 | A | 1/2022 |
| CN | 114550585 | A | 5/2022 |
| CN | 115376414 | A | 11/2022 |
| JP | 2010243863 | A | 10/2010 |

* cited by examiner

1

DISPLAY MODULE AND DISPLAY DEVICE

CROSS REFERENCE TO RELATED APPLICATIONS

The present application is a National Stage of International Application No. PCT/CN2023/110544 filed Aug. 1, 2023, which claims priority to Chinese patent application No. 202211059438.8, filed with the China National Intellectual Property Administration on Aug. 31, 2022, and entitled "Display Module and Display Device", the entire contents of which are hereby incorporated by reference.

TECHNICAL FIELD

The present disclosure relates to the technical field of display apparatus, and in particular to a display module and a display device.

BACKGROUND

One of the stubborn defects in display module products today is the green screen problem. Once it breaks out, it will have a significant impact on the reputation and sales of the terminal brand. Therefore, in order to improve the quality and experience of the product, the green screen problem needs to be solved before the product leaves the factory. After testing and research, testers found that the optical adhesive between the display panel and the cover plate in the display module may overflow when attached. When the overflow is locally aggravated and even extends to the side face of the display panel, it can cause the charges generated during the copper rod test to accelerate and move through the surface of the optical adhesive layer, aggravating accumulation of charges in the edge area of the display panel. This can lead to a serious green screen problem in the local area of the display panel.

SUMMARY

The present disclosure provides a display module and a display device. The display module can ameliorate the problem of green edges of the display panel under copper rod testing or under the influence of an electrostatic field.

In order to achieve the above objects, the present disclosure provides the following technical solutions.

A display module including:

a display panel including a display area and a non-display area surrounding the display area;

an optical adhesive layer, where the optical adhesive layer is arranged on a light-emitting side of the display panel and covers the display area;

a cover plate, where the cover plate is arranged on a side of the optical adhesive layer facing away from the display panel and covers the display panel and the optical adhesive layer.

A side of the cover plate facing the optical adhesive layer is provided with a limiting groove for preventing an edge of the optical adhesive layer from overflowing. At least the edge of the optical adhesive layer is located in the limiting groove.

In some embodiments, the limiting groove is a groove opposite to the optical adhesive layer, and the optical adhesive layer is located in the groove.

In some embodiments, a depth of the groove is less than or equal to a thickness of the optical adhesive layer.

2

In some embodiments, a shape of an area enclosed by side walls of the groove matches the edge of the optical adhesive layer.

In some embodiments, the limiting groove is an annular groove surrounding the edge of the optical adhesive layer, and the edge of the optical adhesive layer is located in the annular groove.

In some embodiments, an assembly gap is arranged between the edge of the optical adhesive layer and side walls of the limiting groove.

In some embodiments, a width of the assembly gap ranges from 0.08 mm to 0.2 mm.

In some embodiments, the display module further includes: a polarizer. The polarizer is arranged between the display panel and the optical adhesive layer, and an edge of the polarizer is flush with an edge of the display panel.

In some embodiments, the display module further includes: a ground layer and a conductive medium in at least one position. The ground layer is arranged on a side of the display panel facing away from the polarizer. The conductive medium is coated on side face(s) of the display panel, and extends to contact with: a side of the cover plate facing the display panel, the edge of the polarizer and side face(s) of the ground layer.

In some embodiments, the optical adhesive layer includes a main body part covering the display area of the display panel and at least one extension part connected with an edge of the main body part. The at least one extension part is arranged in one-to-one correspondence with the conductive medium in at least one position. The at least one extension part is filled between corresponding conductive medium and the main body part.

In some embodiments, an edge of the extension part far away from the main body part is flush with the edge of the display panel.

In some embodiments, a side face of the extension part far away from the main body part is a concave-convex face.

In some embodiments, an orthographic projection of the extension part on the display panel is in a rectangular, trapezoidal or semi-elliptical shape.

In some embodiments, a shape of the main body part of the optical adhesive layer is rectangular, and at least long side(s) of the main body part is/are connected with the extension part.

The present disclosure further provides a display device, including any one display module provided in the above technical solutions.

The present disclosure provides a display module and a display device. The display module includes a display panel, an optical adhesive layer and a cover plate. The display panel includes a display area and a non-display area surrounding the display area. The optical adhesive layer is arranged on the light-emitting side of the display panel, and covers the display area. The cover plate is arranged on the side of the optical adhesive layer facing away from the display panel, and covers the display panel and the optical adhesive layer. Since a side of the cover plate facing the optical adhesive layer is provided with a limiting groove, and at least the edge of the optical adhesive layer is located in the limiting groove, the edge of the optical adhesive layer can be prevented from overflowing. The limiting effect of the limiting groove on the optical adhesive layer can prevent the optical adhesive layer from overflowing to the side face of the display panel, block the path of charge propagation towards the edge of the display panel, and avoid the accumulation of charges in the edge area of the display panel during copper rod testing, thereby ameliorating the problem of green edges of the display panel under the influence of copper rod testing or electrostatic field.

REFERENCE NUMBERS IN THE DRAWINGS

1—display panel; 2—optical adhesive layer; 21—main body part; 22—extension part; 3—cover plate; 31—limiting groove; 311—groove; 312—annular groove; 4—polarizer; 5—ground Layer; 6—conductive medium; 7—cavity.

DETAILED DESCRIPTION

The technical solutions in the embodiments of the present invention will be clearly and completely described below in conjunction with the drawings of embodiments of the present invention. Obviously, the described embodiments are some, but not all of embodiments of the present invention. Based on the described embodiments of the present invention, all other embodiments obtained by those of ordinary skill in the art without creative efforts fall within the scope of the present invention.

Figure 1:
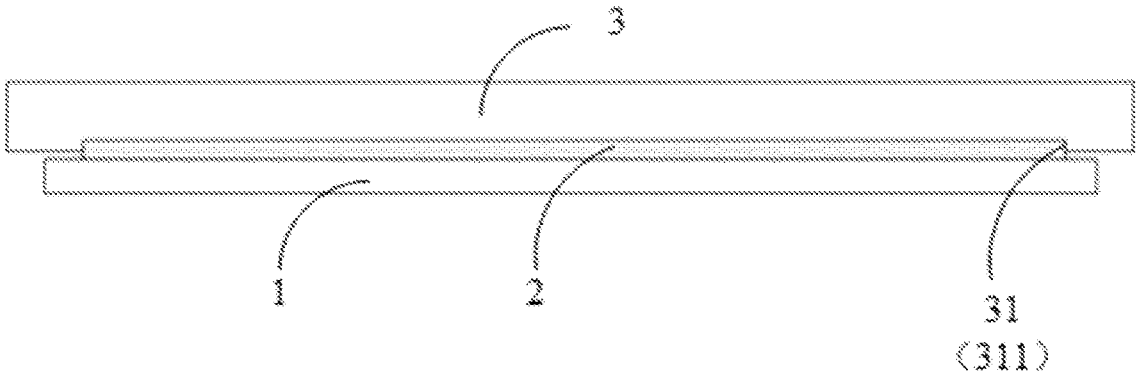
FIG. 1 is a schematic structural diagram of a display module provided by an embodiment of the present invention.

Please refer to FIG. 1. The present disclosure provides a display module, including:

a display panel 1 including a display area and a non-display area surrounding the display area;

an optical adhesive layer 2 arranged on a light-emitting side of the display panel 1 and covering the display area; and a cover plate 3.

The cover plate 3 is arranged on a side of the optical adhesive layer 2 facing away from the display panel 1 and covers the display panel 1 and the optical adhesive layer 2.

A limiting groove 31 is provided at a side of the cover plate 3 facing the optical adhesive layer 2 and is used for preventing an edge of the optical adhesive layer 2 from overflowing. At least the edge of the optical adhesive layer 2 is located in the limiting groove 31.

The display module provided by the above embodiments of the invention includes a display panel 1, an optical adhesive layer 2 and a cover plate 3. The display panel 1 includes a display area and a non-display area surrounding the display area. The optical adhesive layer 2 is arranged on the light-emitting side of the display panel 1, and covers the display area. The cover plate 3 is arranged on the side of the optical adhesive layer 2 facing away from the display panel 1, and covers the display panel 1 and the optical adhesive layer 2. Since a side of the cover plate 3 facing the optical adhesive layer 2 is provided with a limiting groove 31, and at least the edge of the optical adhesive layer 2 is located in the limiting groove 31, the edge of the optical adhesive layer 2 can be prevented from overflowing. The limiting effect of the limiting groove 31 on the optical adhesive layer 2 can prevent the optical adhesive layer 2 from overflowing to the side face of the display panel 1, block the path of charge propagation towards the edge of the display panel 1, and avoid the accumulation of charges in the edge area of the display panel during copper rod testing, thereby ameliorating the problem of green edge of the display panel under the influence of copper rod testing or electrostatic field.

In embodiments of the present invention, as shown in FIGS. 1 to 4 and 6, when the cover plate 3 is attached to the optical adhesive layer 2, at least the edge of the optical adhesive layer 2 can be embedded in the limiting groove 31. The edge of the optical adhesive layer 2 can be limited by the side walls of the limiting groove 31, avoiding the overflow of the optical adhesive layer 2 towards the side face of the display panel 1. The structure is simple and easy to manufacture.

Figure 2:
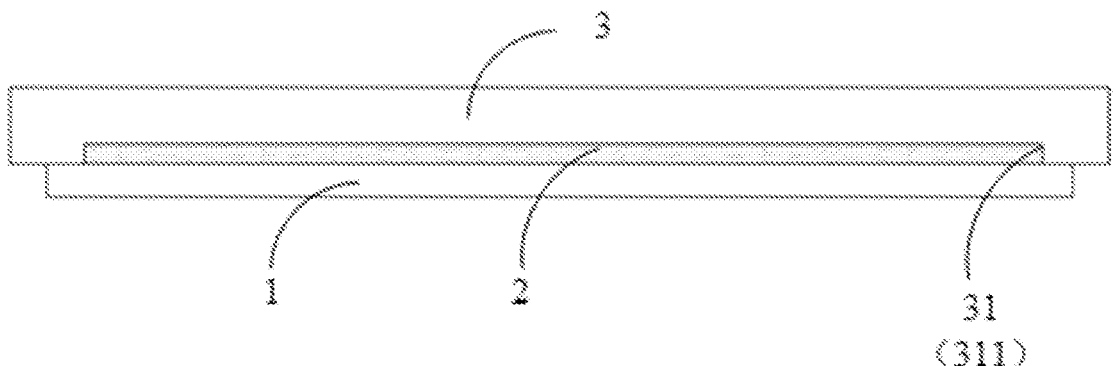
FIG. 2 is another schematic structural diagram of a display module provided by an embodiment of the present invention.

In some embodiments, as shown in FIGS. 1 and 2, the above-mentioned limiting groove 31 can be a groove 311 opposite to the optical adhesive layer 2. The optical adhesive layer 2 is located in the groove 311. That is, the entire optical adhesive layer is located in the groove 311. When the cover plate 3 is attached to the optical adhesive layer 2, the optical adhesive layer 2 is embedded in the groove 311. The edge of the optical adhesive layer 2 can be limited through the side walls of the groove 311 to prevent the optical adhesive layer 2 from overflowing, thereby avoiding the accumulation of charges in the edge area of the display panel and ameliorating the problem of greening at the edge of the display panel.

Figure 3:
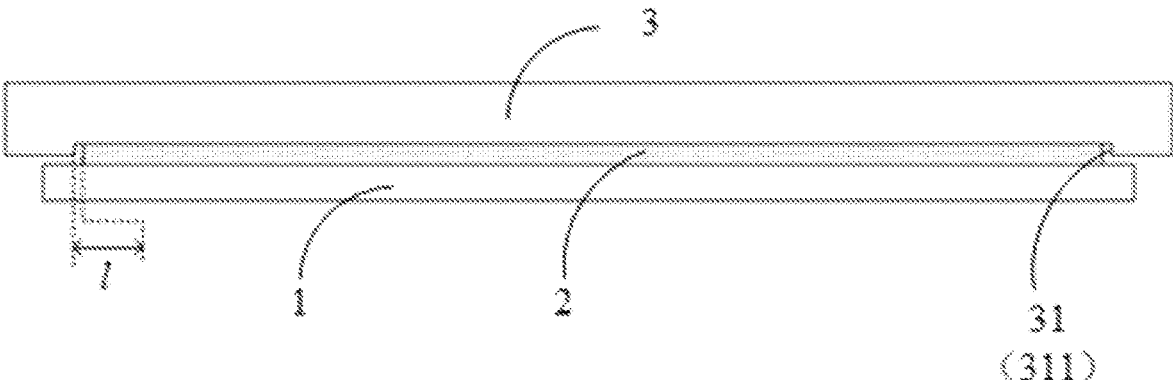
FIG. 3 is another schematic structural diagram of a display module provided by an embodiment of the present invention.
Figure 4:
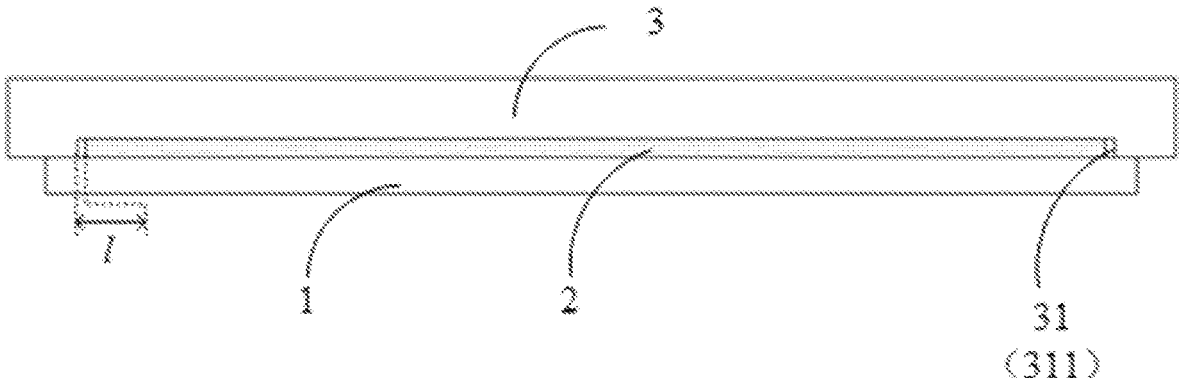
FIG. 4 is another schematic structural diagram of a display module provided by an embodiment of the present invention.

In embodiments of the present invention, the depth of the above-mentioned groove 311 can be less than or equal to the thickness of the optical adhesive layer 2, which can not only ensure the adhesion between the side face of the optical adhesive layer 2 facing away from the cover plate 3 and other film layers, but also ensure the position limiting of the edge of the optical adhesive layer 2 by the groove 311. As shown in FIGS. 1 and 3, the depth of the groove 311 may be less than the thickness of the optical glue layer 2. As shown in FIGS. 2 and 4, the depth of the groove 311 may be equal to the thickness of the optical glue layer 2. For example, the depth of the above-mentioned groove 311 may be 0.1 mm-0.15 mm, and the specific value can be set according to the thickness of the optical adhesive layer 2, and is not limited here.

Figure 5:
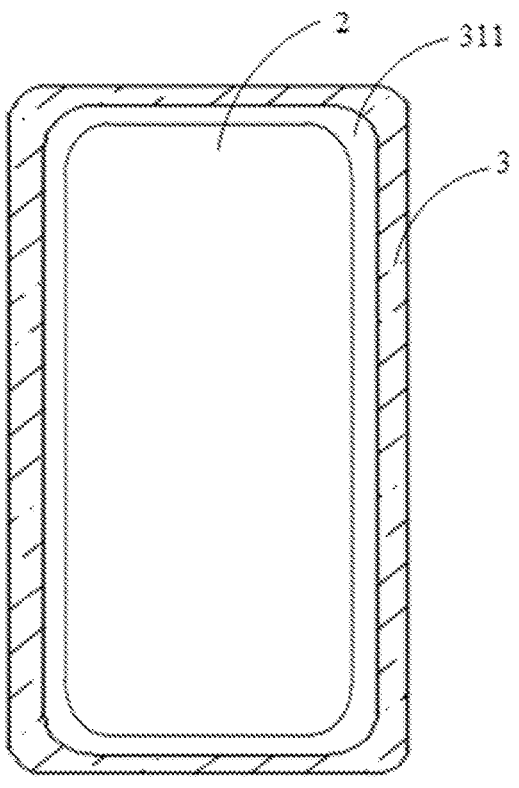
FIG. 5 is a schematic structural diagram of a cover plate and an optical adhesive layer bonded together according to an embodiment of the present invention.

In some embodiments, as shown in FIG. 5, the shape of the area enclosed by the side walls of the groove 311 can match the edge of the optical adhesive layer 2, so that the edge of the optical adhesive layer 2 can be limited more accurately. It should be noted that the shape of the area enclosed by the side walls of the groove 311 matches the edge of the optical adhesive layer 2 means that the edge of the optical adhesive layer 2 is just in contact with the side walls of the groove 311, or, the gap width between the edge of the optical adhesive layer 2 and the side wall of the groove 311 is equal everywhere.

In some embodiments, the shape enclosed by the side walls of the groove 311 may not match the edge of the optical adhesive layer 2, as long as the optical adhesive layer 2 is located within the groove 311. The shape of the groove 311 can be determined according to the actual situation, and it is not limited here.

In some embodiments, as shown in FIGS. 3, 4 and 5, an assembly gap may be arranged between the side walls of the limiting groove 31 and the optical adhesive layer 2, which can ensure that the optical adhesive layer 2 is embedded in the limit groove 31 in the event of assembly errors between the optical adhesive layer and the limit groove 31.

In some embodiments, the width 'l' of the assembly gap can range from 0.08 mm to 0.2 mm to meet the requirements of assembly errors.

As shown in FIG. 5, the surface of the cover plate 3 facing the display panel 1 may be approximately rectangular. The distances between the edge of the groove 311 and the four edges of the cover plate 3 may be equal. For example, the distance between the edge of the groove 311 and the edge of the cover plate 3 may be greater than or equal to 0 and less than or equal to 0.15 mm.

Figure 6:
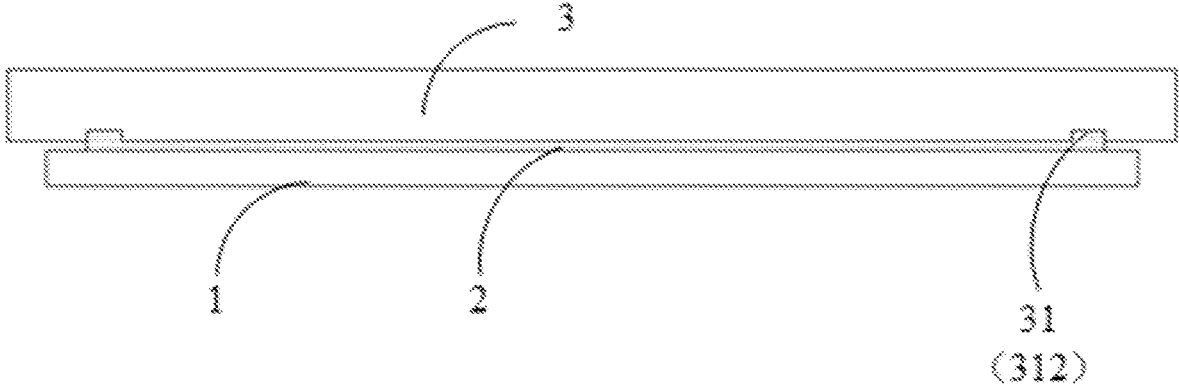
FIG. 6 is another schematic structural diagram of a display module provided by an embodiment of the present invention.
Figure 7:
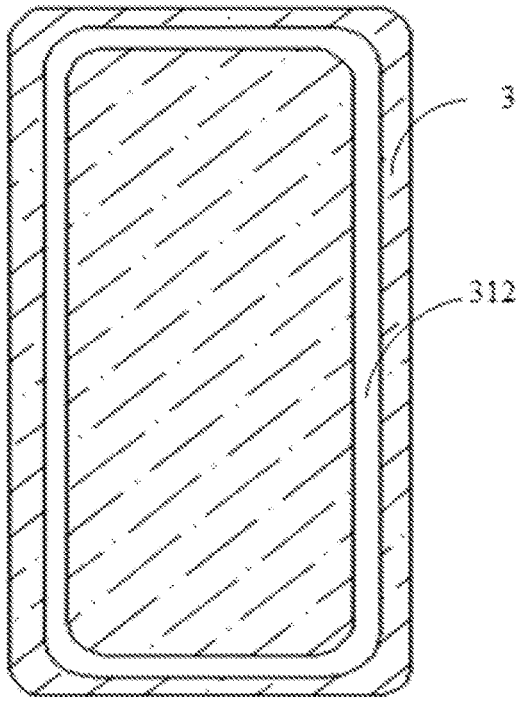
FIG. 7 is a schematic structural diagram of a cover plate provided by an embodiment of the present invention.

In another possible implementation, as shown in FIGS. 6 and 7, the above-mentioned limiting groove 31 can also be an annular groove 312 surrounding the edge of the optical adhesive layer 2. The edge of the optical adhesive layer 2 is located in the annular groove 312. Since the annular groove 312 is arranged around the edge of the optical adhesive layer 2, when the cover plate 3 and the optical adhesive layer 2 are attached, the edge of the optical adhesive layer 2 can be embedded in the annular groove 312. The outer walls of the annular groove 312 can serve as a limiting effect on the optical adhesive layer 2, avoiding overflow of the optical adhesive layer 2.

In embodiments of the present invention, there may be an assembly error between the outer walls of the annular groove 312 and the edge of the optical adhesive layer 2. For example, the width of the assembly gap can range from 0.08 mm to 0.2 mm to meet the requirements of assembly errors.

Figure 8:
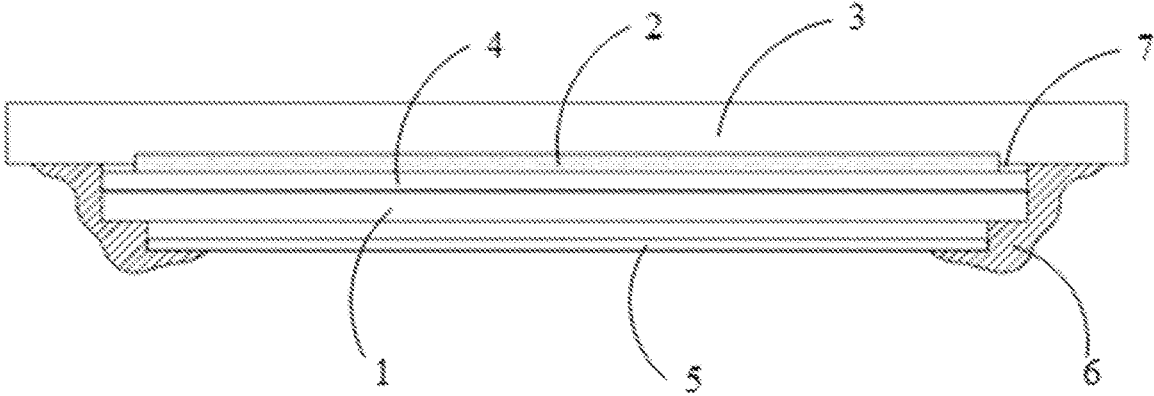
FIG. 8 is another schematic structural diagram of a display module provided by an embodiment of the present invention.

In embodiments of the present invention, as shown in FIG. 8, the display module further includes a polarizer 4. The polarizer 4 is arranged between the display panel 1 and the optical adhesive layer 2. The edge of the polarizer 4 is flush with the edge of the display panel 1, thereby improving the light emission effect of the display module. It should be noted that the edge of the polarizer 4 being flush with the edge of the display panel 1 does not mean that it is absolutely flush, but that it is flush within the actual process error range.

In embodiments of the present invention, as shown in FIG. 8, the display module further includes: a ground layer 5 and a conductive medium 6 in at least one position. The ground layer 5 is arranged on the side of the display panel 1 facing away from the polarizer 4. The conductive medium 6 is coated on the side face(s) of the display panel 1, and extends to contact with the side face of the cover plate 3 facing the display panel 1, the edge(s) of the polarizer 4 and the side face(s) of the ground layer 5. By arranging the conductive medium 6 on the side face(s) of display panel 1, the charges can accelerate and move to the surface of grounding layer 5 during copper rod testing, so that the static electricity can be conducted away through the ground layer 5, which can reduce or even eliminate the local greening of the display panel 1. For example, the above-mentioned conductive medium 6 can be conductive silver paste.

During the assembly process of the above display module, the optical adhesive layer 2 is adhered to the cover plate 3 and the polarizer 4 respectively. Due to the assembly error, the size of the optical adhesive layer 2 needs to be smaller than the size of the display panel 1 and the size of the polarizer 4 to ensure that the optical adhesive layer 2 does not interfere with other devices after assembly. However, testers found that when there is a cavity 7 at the edge of the conductive medium 6 and the edge of the optical adhesive layer 2, water vapor will be accommodated in the cavity 7. Water vapor as a solution may cause the Ag+ in the silver paste to react with the I molecules in the polarizer 4 $(2Ag^+ + I_2 = 2AgI)$, which may lead to the failure of the iodine molecules in the corresponding area of the polarizer 4, and then cause whitening in the area of the polarizer 4, and even in the display area corresponding to the polarizer 4.

Figure 9:
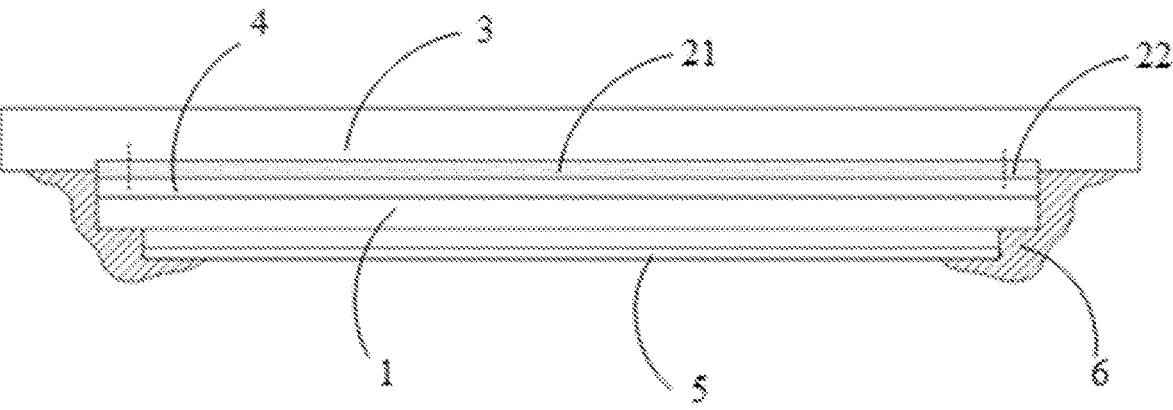
FIG. 9 is another schematic structural diagram of a display module provided by an embodiment of the present invention.
Figure 10:
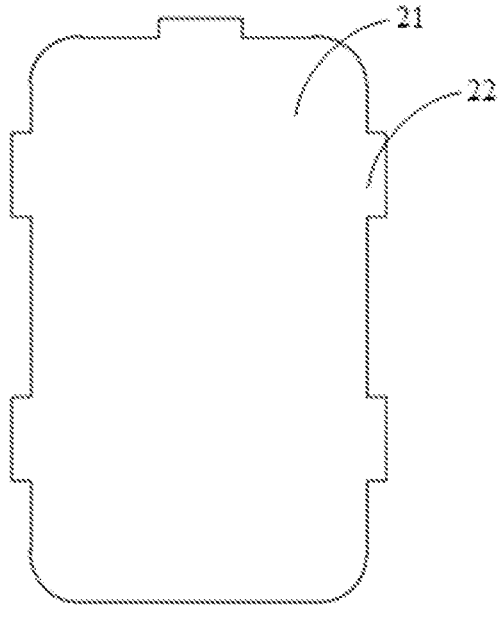
FIG. 10 is a schematic structural diagram of an optical adhesive layer provided by an embodiment of the present invention.

In embodiments of the present invention, in order to avoid the problem of whitening of the polarizer 4, as shown in FIGS. 9 and 10, the above-mentioned optical adhesive layer 2 may include a main body part 21 covering the display area of the display panel 1 and at least one extension part 22 connected with an edge of the main body part 21. The at least one extension part 22 is arranged in one-to-one correspondence with the conductive medium 6 in at least one position. That is, each extension part 22 is arranged corresponding to the conductive medium 6 in one position. The extension part 22 can be filled between the corresponding conductive medium 6 and the main body part 21, so that there is no cavity 7 between the conductive medium 6 and the optical adhesive layer 2 at the location where the conductive medium 6 is coated, to avoid the entry of water vapor at the location where the conductive medium 6 is coated, thereby avoiding the reaction between $Ag^+$ in the conductive medium 6 and I molecules in the polarizer 4, and solving the problem of whitening of the polarizer 4.

In some embodiments, as shown in FIG. 9, the edge of the extension part 22 far away from the main body part 21 may be flush with the edge of the display panel 1. Since the conductive medium 6 covers the extension part 22, the conductive medium 6 can limit the adhesive overflow of the extension part 22. Alternatively, since the extension part 22 is covered by the conductive medium 6, the extension part 22 can also appropriately extend beyond the edge of the display panel 1. The provision of the conductive medium 6 can eliminate the problem of local greening of the display panel 1 caused by the overflow of the optical adhesive layer 2.

In some embodiments, the side face of the extension part 22 far away from the main body part 21 can be a concave-convex face, which can enhance the adhesion ability of the conductive medium 6 at that location.

In some embodiments, the orthographic projection of the above-mentioned extension part 22 on the display panel 1 may be in a rectangular shape, trapezoidal shape, semi-elliptical shape, etc., or may be in other shapes, which is arranged according to the actual situation, and is not limited here. For example, as shown in FIG. 10, the orthographic projection of the extension part 22 on the display panel 1 is rectangular. Or, as shown in FIG. 11, the orthographic projection of the extension part 22 on the display panel 1 is semi-elliptical.

In some embodiments, the shape of the main body part 21 of the optical adhesive layer 2 may be rectangular. At least the long side(s) of the main body part 21 is/are connected with the extension part(s) 22, as shown in FIGS. 10 and 11. There are extension parts 22 on the both long sides of the optical adhesive layer 2. That is, the conductive medium 6 can be coated on the areas corresponding to the long sides of the display panel 1 to ensure the extraction of electrostatic charges. The extension parts 22 of the optical adhesive layer 2 correspond to the positions of the conductive medium 6, which can avoid the problem of the polarizer 4 becoming white. The number and size of the extension parts 22 on the long side of the optical adhesive layer 2 can be determined according to the size of the long side of the optical adhesive layer 2, and there is no limit here. For example, two extension parts 22 can be provided on the long side in FIGS. 10 and 11, and the extension parts 22 on the two long sides of the optical adhesive layer 2 can be arranged oppositely.

Figure 11:
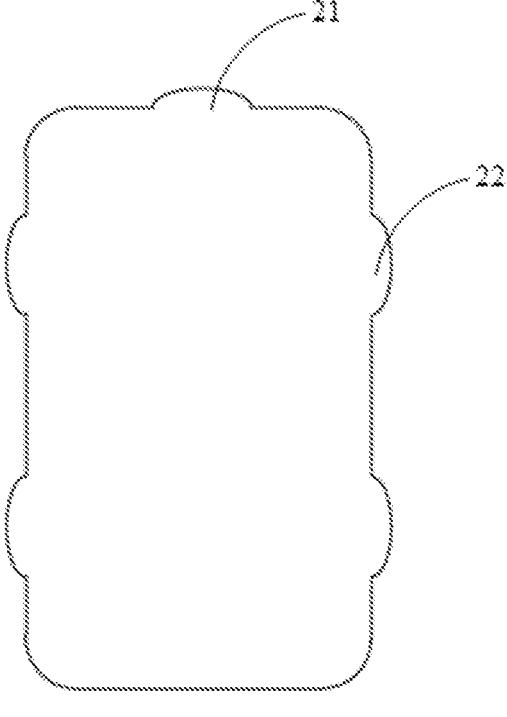
FIG. 11 is another schematic structural diagram of an optical adhesive layer provided by an embodiment of the present invention.

In some embodiments, at least one short side of the main body part 21 may be connected with the extension part 22, as shown in FIGS. 10 and 11. That is, the conductive medium 6 can be coated on the area corresponding to the short side of the display panel 1 to ensure the extraction of electrostatic charges. The extension part 22 of the optical adhesive layer 2 corresponds to the position of the conductive medium 6, which can avoid the problem of the polarizer 4 becoming white. The number and size of the extension parts 22 on the short side of the optical adhesive layer 2 can be determined according to the size of the long side of the optical adhesive layer 2.

In embodiments of the present invention, the display module may include a composite film layer arranged on a side of the display panel 1 facing away from the polarizer 4. The composite film layer may include an adhesive layer, a foam layer and a heat dissipation layer stacked in sequence in a direction away from the display panel 1. The heat dissipation layer is generally made of metal material (for example, copper Cu). The heat dissipation layer can be used as the ground layer 5, that is, the heat dissipation layer can be grounded to conduct the charge at the edge of the display panel 1 and avoid the occurrence of local greening of display panel 1.

The present disclosure further provides a display device, including any one of the display module provided in the above technical solutions.

Evidently those skilled in the art can make various modifications and variations to the present invention without departing from the spirit and scope of the present invention. Thus the present invention is also intended to encompass these modifications and variations therein as long as these modifications and variations to the present invention come into the scope of the claims of the present invention and their equivalents.

What is claimed is:

1. A display module, comprising:
   a display panel comprising a display area and a non-display area surrounding the display area;
   an optical adhesive layer, wherein the optical adhesive layer is on a light-emitting side of the display panel and covers the display area;
   a cover plate, wherein the cover plate is on a side of the optical adhesive layer facing away from the display panel and covers the display panel and the optical adhesive layer;
   wherein a side of the cover plate facing the optical adhesive layer is provided with a limiting groove for preventing an edge of the optical adhesive layer from overflowing, and at least the edge of the optical adhesive layer is in the limiting groove;
   a polarizer, wherein the polarizer is between the display panel and the optical adhesive layer, and an edge of the polarizer is flush with an edge of the display panel;
   a ground layer, and
   a conductive medium in at least one position;
   wherein the ground layer is on a side of the display panel facing away from the polarizer;
   the conductive medium is coated on a side face of the display panel, and extends to contact with: a side of the cover plate facing the display panel, the edge of the polarizer and a side face of the ground layer; and
   the optical adhesive layer comprises:
      a main body part covering the display area of the display panel; and
      at least one extension part connected with an edge of the main body part;
   wherein the at least one extension part is arranged in one-to-one correspondence with the conductive medium in at least one position; and
   the extension part is filled between corresponding conductive medium and the main body part.

2. The display module according to claim 1, wherein the limiting groove is a groove opposite to the optical adhesive layer, and the optical adhesive layer is in the groove.

3. The display module according to claim 2, wherein a depth of the groove is less than or equal to a thickness of the optical adhesive layer.

4. The display module according to claim 2, wherein a shape of an area enclosed by side walls of the groove matches the edge of the optical adhesive layer.

5. The display module according to claim 1, wherein the limiting groove is an annular groove surrounding the edge of the optical adhesive layer, and the edge of the optical adhesive layer is in the annular groove.

6. The display module according to claim 1, wherein an assembly gap is arranged between the edge of the optical adhesive layer and side walls of the limiting groove.

7. The display module according to claim 6, wherein a width of the assembly gap ranges from 0.08 mm to 0.2 mm.

8. The display module according to claim 1, wherein an edge of the extension part far away from the main body part is flush with the edge of the display panel.

9. The display module according to claim 1, wherein a side face of the extension part far away from the main body part is a concave-convex face.

10. The display module according to claim 1, wherein an orthographic projection of the extension part on the display panel is in a rectangular, trapezoidal or semi-elliptical shape.

11. The display module according to claim 1, wherein a shape of the main body part of the optical adhesive layer is rectangular, and at least a long side of the main body part is connected with the extension part.

12. A display device, comprising the display module according to claim 1.

13. The display module according to claim 11, wherein two long sides of the main body part are connected with the extension parts.

14. The display module according to claim 13, wherein the extension parts connected to the two long sides of the main body part are arranged oppositely.

15. The display module according to claim 11, wherein at least a short side of the main body part is connected with the extension part.

* * * * *